US012562585B2

(12) United States Patent
Wu et al.

(10) Patent No.: US 12,562,585 B2
(45) Date of Patent: Feb. 24, 2026

(54) ENERGY STORAGE SYSTEM AND ENERGY STORAGE SYSTEM CONTROL METHOD

(71) Applicant: Contemporary Amperex Technology (Hong Kong) Limited, Hong Kong (CN)

(72) Inventors: Kai Wu, Fujian (CN); Xinwei Chen, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/979,531

(22) Filed: Dec. 12, 2024

(65) Prior Publication Data

US 2025/0112486 A1 Apr. 3, 2025

Related U.S. Application Data

(63) Continuation of application No. PCT/CN2022/126463, filed on Oct. 20, 2022.

(51) Int. Cl.
*H02J 7/00* (2006.01)
*H01M 10/42* (2006.01)
*H02J 7/06* (2006.01)

(52) U.S. Cl.
CPC ....... *H02J 7/00712* (2020.01); *H01M 10/425* (2013.01); *H02J 7/06* (2013.01); *H01M 2010/4271* (2013.01); *H02J 2207/20* (2020.01)

(58) Field of Classification Search
CPC .................................................... H02J 7/0014
See application file for complete search history.

(56) References Cited

U.S. PATENT DOCUMENTS

| | | | | |
|---|---|---|---|---|
| 2013/0293198 A1* | 11/2013 | Nakashima | ........... | H02J 7/0016 |
| | | | | 320/134 |
| 2025/0079871 A1* | 3/2025 | Wu | ....................... | H02J 7/0013 |

FOREIGN PATENT DOCUMENTS

| | | | | |
|---|---|---|---|---|
| CN | 113437780 A | | 9/2021 | |
| CN | 113517747 A | * | 10/2021 | ......... H01M 10/441 |
| CN | 113541268 A | | 10/2021 | |
| CN | 215870854 | * | 2/2022 | |
| CN | 114583807 A | | 6/2022 | |
| CN | 216872891 U | | 7/2022 | |
| CN | 217335167 U | | 8/2022 | |

(Continued)

OTHER PUBLICATIONS

CN-113517747 translation, Cao,Battery Cluster Balanced Energy Storage System And Control Method Thereof (Year: 2021).*

(Continued)

*Primary Examiner* — Tynese V McDaniel
(74) *Attorney, Agent, or Firm* — XSENSUS LLP

(57) ABSTRACT

An embodiment of this application provides an energy storage system and an energy storage system control method. The energy storage system includes N battery clusters and N-X first conversion units, where N is a positive integer greater than 1 and X is a positive integer less than N. A first side of each of N-X first conversion units is connected in series to a power transmission circuit of one of N-X first battery clusters among the N battery clusters, so as to combine with a corresponding first battery cluster to form a series branch circuit. The N-X series branch circuits are connected in parallel to X second battery clusters in the N battery clusters.

16 Claims, 7 Drawing Sheets

<u>100</u>

(56)                    References Cited

FOREIGN PATENT DOCUMENTS

JP       2022-023722  A     2/2022
WO       2022/011904  A1    1/2022

OTHER PUBLICATIONS

CN215870854_translation ,Cao,Battery Cluster Equalization Energy Storage System (Year: 2022).*

International Search Report and Written Opinion mailed on Dec. 27, 2022, received for International Patent Application No. PCT/CN2022/126463, filed on Oct. 20, 2022, 11 pages including English Translation.

* cited by examiner

100

100

200

| Control, based on status of a series branch circuit, a first conversion unit to regulate a voltage of a first battery cluster corresponding to the first conversion unit | S210 |
|---|---|

10

ENERGY STORAGE SYSTEM AND ENERGY STORAGE SYSTEM CONTROL METHOD

CROSS-REFERENCE TO RELATED APPLICATION

This application is a continuation of International Application No. PCT/CN2022/126463, filed on Oct. 20, 2022, which is hereby incorporated by reference in its entirety.

TECHNICAL FIELD

This application relates to the technical field of energy storage, and in particular, to an energy storage system and an energy storage system control method.

BACKGROUND

In current mainstream energy storage systems, a plurality of batteries are connected in series to form a cluster, and a plurality of clusters are directly connected in parallel to increase an energy storage capacity. However, with the accrual of the operating time, the batteries in the energy storage system become inconsistent slowly. Adding or replacing a battery will lead to internal circulation of electric current due to a voltage difference between the batteries. The internal circulation of electric current leads to further imbalance between the batteries in the energy storage system, thereby resulting in performance deterioration or even damage of the whole energy storage system.

Therefore, how to ensure equalization between the battery clusters in the energy storage system to enhance the overall performance of the energy storage system is an urgent technical problem.

SUMMARY

An embodiment of this application provides an energy storage system and an energy storage system control method to ensure equalization between battery clusters in the energy storage system, and in turn, enhance the overall performance of the energy storage system.

According to a first aspect, an energy storage system is provided, including N battery clusters and N-X first conversion units, where N is a positive integer greater than 1 and X is a positive integer less than N. A first side of each of N-X first conversion units is connected in series to a power transmission circuit of one of N-X first battery clusters among the N battery clusters, so as to combine with a corresponding first battery cluster to form a series branch circuit. The N-X series branch circuits are connected in parallel to X second battery clusters in the N battery clusters.

In an embodiment of this application, the N battery clusters include N-X first battery clusters and X second battery clusters. Each first battery cluster among the N-X first battery clusters is connected in series to the first conversion unit, so as to form N-X series branch circuits. The N-X series branch circuits are then connected in parallel to X second battery clusters. The energy storage system regulates the corresponding first battery clusters through the N-X first conversion units in the N-X series branch circuits, thereby not only reducing or even avoiding the current circulation between the N battery clusters on the one hand, maintaining the consistency between the N battery clusters, and in turn, maximally enhancing the capacity and performance of the energy storage system. On the other hand, just N-X first battery clusters in the energy storage system are equipped with the first conversion unit, thereby relatively reducing the loss, cost, size, and weight of the energy storage system.

In a possible embodiment, the energy storage system further includes a management unit. The management unit is configured to control, based on status of the series branch circuit, the first conversion unit to regulate a voltage of the first battery cluster corresponding to the first conversion unit.

In this embodiment of this application, the N battery clusters include N-X first battery clusters each equipped with the first conversion unit, and X second battery clusters not equipped with the first conversion unit. Benchmarked against the X second battery clusters, the corresponding first battery cluster is regulated by use of the first conversion unit to reduce the error between the first battery cluster and the X second battery clusters, thereby maintaining consistency of the entire energy storage system. The management unit controls the first conversion unit to regulate the voltage of the first battery cluster corresponding to the first conversion unit, thereby improving the regulation efficiency of the energy storage system.

In a possible embodiment, the management unit is configured to: control, in a case that a voltage difference between the series branch circuit and the X second battery clusters is greater than a first threshold, the first conversion unit to regulate the voltage of the corresponding first battery cluster so that a voltage difference between the first battery cluster corresponding to the first conversion unit and the X second battery clusters is less than the first threshold, and control the series branch circuit to be connected in parallel to the X second battery clusters.

In this embodiment of this application, when the voltage difference between the series branch circuit and the X second battery clusters is greater than the first threshold, the voltage difference between the series branch circuit and the X second battery clusters has already caused an internal circulating current in the energy storage system, and has caused an impact on the performance of the energy storage system. In this case, the management unit controls the first conversion unit to regulate the voltage of the corresponding first battery cluster to reduce the voltage difference between the first battery cluster and the X second battery clusters, thereby ensuring the equalization and safety of the energy storage system.

In a possible embodiment, the management unit is configured to: control, in a case that a voltage difference between the series branch circuit and the X second battery clusters is less than a first threshold, the series branch circuit to be connected in parallel to the X second battery clusters.

In this embodiment of this application, when the voltage difference between the series branch circuit and the X second battery clusters is less than the first threshold, the impact caused by the voltage difference onto the performance of the energy storage system is negligible. The management unit controls the series branch circuit to be directly connected in parallel to the energy storage system, where the voltage difference between the series branch circuit and the X second battery clusters is less than the first threshold, thereby ensuring high capacity and performance of the energy storage system.

In a possible embodiment, the management unit is configured to: control, in a case that a SOC difference between the series branch circuit and the X second battery clusters is greater than a second threshold, the first conversion unit to regulate the current of the corresponding first battery cluster so that a SOC difference between the first battery cluster corresponding to the first conversion unit and the X second battery clusters is less than the second threshold, and control the series branch circuit to be connected in parallel to the X second battery clusters.

In this embodiment of this application, when the SOC difference between a series branch circuit and the X second battery clusters is greater than the second threshold, the SOC of the branch circuit is abnormal. By controlling the first conversion unit, the management unit can directly regulate the SOC of the first battery cluster of the branch circuit to a value that is substantially the same as the SOC of the X second battery clusters, so as to most intuitively ensure a stabilized capacity of the first battery cluster, and in turn, effectively ensure high charge-and-discharge performance of all the battery clusters in the energy storage system.

In a possible embodiment, the management unit is further configured to: control, in a case that a SOC difference between the series branch circuit and the X second battery clusters is less than or equal to a second threshold, the series branch circuit to be connected in parallel to the X second battery clusters.

In this embodiment of this application, when the SOC difference between a series branch circuit and the X second battery clusters is not greater than the second threshold, the SOC difference between the series branch circuit and the X second battery clusters causes no impact onto the energy storage system, and the series branch circuit can be directly connected in parallel into the energy storage system. The management unit controls the series branch circuit to be directly connected in parallel into the energy storage system, where the SOC difference between the series branch circuit and the X second battery clusters is not greater than the second threshold, thereby improving the efficiency of the energy storage system in regulating the abnormal first battery cluster.

In a possible embodiment, a regulation manner of the current $I_2$ is:

$$I_2 = I + f(\Delta SOC)$$

In a case that $\Delta SOC$ is greater than 0, $$f(\Delta SOC) = k * ((1 + \Delta SOC)^n - 1).$$

Alternatively, in a case that $\Delta SOC$ is less than 0, $$f(\Delta SOC) = -k * ((1 + \Delta SOC)^n - 1).$$

In the formulas above, $\Delta SOC$ is the SOC difference between the first battery cluster corresponding to the first conversion unit and the X second battery clusters, I is an average cluster current of the X second battery clusters, k is a linear coefficient, and n is a power exponent.

In this embodiment of this application, the current $I_2$ and the SOC calculated by use of the formula may correspond to the SOC of the X second battery clusters to a high degree of correspondence, thereby enabling the energy storage system to quickly regulate the SOC of the first battery cluster to the SOC of the X second battery clusters based on the current, and in turn, enhancing the efficiency of the energy storage system in regulating the abnormal battery cluster.

In a possible embodiment, a regulation manner of the current $I_2$ is:

$$I_2 = k * I.$$

In a case that $\Delta SOC$ is greater than 0 in a charging process, a value range of k is 0 to 1.

Alternatively, in a case that $\Delta SOC$ is less than 0 in a charging process, a value range of k is 1 to 100.

Alternatively, in a case that $\Delta SOC$ is greater than 0 in a discharging process, a value range of k is 1 to 100.

Alternatively, in a case that $\Delta SOC$ is less than 0 in a discharging process, a value range of k is 0 to 1.

$\Delta SOC$ is the SOC difference between the first battery cluster corresponding to the first conversion unit and the X second battery clusters, and I is an average cluster current of the X second battery clusters.

In this embodiment of this application, by means of the above formulas, the management unit can determine different currents $I_2$ based on different formulas in a case that the SOC difference $\Delta SOC$ between the first battery cluster in the abnormal series branch circuit and the X second battery clusters varies and that the energy storage system is in different states. The formula is easy to operate, and also takes into account the average cluster current I of the X second battery clusters, thereby enabling the abnormal first battery cluster to be quickly regulated, ensuring equalization between all the N battery clusters in the energy storage system, and in turn, improving the efficiency of the energy storage system in regulating the first battery cluster.

In a possible embodiment, the energy storage system further includes a second conversion unit. A first side of the second conversion unit is connected to a power grid. A second side of the second conversion unit is connected to a second side of the first conversion unit.

In this embodiment of this application, a second conversion unit is further connected between the power grid and each series branch circuit. The second conversion unit converts the voltage between the power grid and the N battery clusters appropriately, thereby further reducing the loss of the whole energy storage system.

In a possible embodiment, in a case that the first conversion unit is a DC-to-DC converter and the second conversion unit is a DC-to-DC converter, the second conversion unit is connected to a direct-current side of the power grid.

In this embodiment of this application, when both the first conversion unit and the second conversion unit are DC-to-DC converters, the second conversion unit is caused to be connected to the direct-current side of the power grid to ensure normal functions of the energy storage system.

In a possible embodiment, in a case that the first conversion unit is a DC-to-DC converter and the second conversion unit is a DC-to-AC converter, the second conversion unit is connected to an alternating-current side of the power grid.

In this embodiment of this application, when the first conversion unit is a DC-to-DC converter and the second conversion unit is a DC-to-AC converter, the second conversion unit is caused to be connected to the alternating-current side of the power grid to ensure normal functions of the energy storage system.

In a possible embodiment, in a case that the first conversion unit is a DC-to-DC converter and the second conversion unit is a direct-current power source, each first conversion unit is equipped with one second conversion unit.

In this embodiment of this application, when the first conversion unit is a DC-to-DC converter, by causing the second conversion unit to be a direct-current power source and equipping each first conversion unit with a second conversion unit separately, the second conversion unit directly provides the desired voltage to each first conversion unit, thereby regulating each series branch circuit accurately and achieving further equalization of the energy storage system.

In a possible embodiment, in a case that the first conversion unit is a DC-to-DC converter and the second conversion unit is a direct-current power source, the first conversion units share one second conversion unit.

In this embodiment of this application, when the first conversion unit is a DC-to-DC converter, by causing the second conversion unit to be a direct-current power source and causing all the first conversion units to share one second conversion unit, the second conversion unit can provide the desired voltage to the series branch circuit directly, and the cost of the energy storage system can be further reduced.

In a possible embodiment, in a case that the first conversion unit is a DC-to-AC converter and the second conversion unit is an alternating-current power source, each first conversion unit is equipped with one second conversion unit.

In this embodiment of this application, when the first conversion unit is a DC-to-AC converter, by causing the second conversion unit to be an alternating-current power source and equipping each first conversion unit with a second conversion unit separately, the second conversion unit directly provides the desired voltage to each first conversion unit, thereby regulating each series branch circuit accurately and achieving further equalization of the energy storage system.

In a possible embodiment, in a case that the first conversion unit is a DC-to-AC converter and the second conversion unit is an alternating-current power source, the first conversion units share one second conversion unit.

In this embodiment of this application, when the first conversion unit is a DC-to-AC converter, by causing the second conversion unit to be an alternating-current power source and causing all the first conversion units to share one second conversion unit, the second conversion unit can provide the desired voltage to the series branch circuit directly, and the cost of the energy storage system can be further reduced.

In a possible embodiment, the energy storage system further includes N-X bypass switches. The bypass switches are configured to bypass the first conversion unit.

In this embodiment of this application, N-X bypass switches are disposed in the energy storage system. That is, each first conversion unit is equipped with a bypass switch separately. With the bypass switches disposed, the first battery clusters corresponding to the N-X first conversion units in the energy storage system can be regulated and controlled more flexibly.

In a possible embodiment, the bypass switches are built into the first conversion unit.

In this embodiment of this application, the bypass switch is configured to bypass the first conversion unit, so as to more flexibly regulate and control the first battery cluster corresponding to the first conversion unit. The bypass switch built into the first conversion unit plays the role of the bypass switch itself and also reduces the area occupied by the bypass switch, thereby further reducing the size of the energy storage system.

In a possible embodiment, the energy storage system further includes N branch switches. Each of the branch switches is disposed in a branch circuit at which each battery cluster is located.

In this embodiment of this application, the energy storage system includes N branch switches. The branch circuit in which each battery cluster is located is equipped with a separate branch switch. That is, the branch switches are in one-to-one correspondence with the battery clusters. In this way, parallel connection between N battery clusters can be implemented by controlling the branch switches. The control manner is a simple and reliable.

According to a second aspect, an energy storage system control method is provided. The energy storage system includes N battery clusters, N-X first conversion units, and a management unit, where N is a positive integer greater than 1 and X is a positive integer less than N. A first side of each of N-X first conversion units is connected in series to a power transmission circuit of one of N-X first battery clusters among the N battery clusters, so as to combine with a corresponding first battery cluster to form a series branch circuit. The N-X series branch circuits are connected in parallel to X second battery clusters in the N battery clusters. The method includes: controlling, based on status of the series branch circuit, the first conversion unit to regulate a voltage of the first battery cluster corresponding to the first conversion unit.

In a possible embodiment, the controlling the first conversion unit to regulate a voltage of the first battery cluster corresponding to the first conversion unit includes: controlling, in a case that a voltage difference between the series branch circuit and the X second battery clusters is greater than a first threshold, the first conversion unit to regulate the voltage of the corresponding first battery cluster so that a voltage difference between the first battery cluster corresponding to the first conversion unit and the X second battery clusters is less than the first threshold.

In a possible embodiment, the method further includes: controlling, in a case that a voltage difference between the series branch circuit and the X second battery clusters is less than a first threshold, the series branch circuit to be connected in parallel to the X second battery clusters.

In a possible embodiment, the controlling the first conversion unit to regulate a voltage of the first battery cluster corresponding to the first conversion unit includes: controlling, in a case that a SOC difference between the series branch circuit and the X second battery clusters is greater than a second threshold, the first conversion unit to regulate a current of the corresponding first battery cluster so that a SOC difference between the first battery cluster corresponding to the first conversion unit and the X second battery clusters is less than the second threshold.

In a possible embodiment, the method further includes: controlling, in a case that a SOC difference between the series branch circuit and the X second battery clusters is less than or equal to a second threshold, the series branch circuit to be connected in parallel to the X second battery clusters.

In a possible embodiment, a regulation manner of the current $I_2$ is:

$$I_2 = I + f(\Delta SOC).$$

7

In a case that ΔSOC is greater than 0, $$f(\Delta SOC) = k*((1 + \Delta SOC)^n - 1).$$

Alternatively, in a case that ΔSOC is less than 0, $$f(\Delta SOC) = -k*((1 + \Delta SOC)^n - 1).$$

In the formulas above, ΔSOC is the SOC difference between the first battery cluster corresponding to the first conversion unit and the X second battery clusters, I is an average cluster current of the X second battery clusters, k is a linear coefficient, and n is a power exponent.

In a possible embodiment, a regulation manner of the current $I_2$ is:

$$I_2 = k*I.$$

In a case that ΔSOC is greater than 0 in a charging process, a value range of k is 0 to 1.

Alternatively, in a case that ΔSOC is less than 0 in a charging process, a value range of k is 1 to 100.

Alternatively, in a case that ΔSOC is greater than 0 in a discharging process, a value range of k is 1 to 100.

Alternatively, in a case that ΔSOC is less than 0 in a discharging process, a value range of k is 0 to 1.

ΔSOC is the SOC difference between the first battery cluster corresponding to the first conversion unit and the X second battery clusters, and I is an average cluster current of the X second battery clusters.

According to a third aspect, an energy storage system control apparatus is provided, including a processor and a memory. The memory is configured to store a computer program. The processor is configured to call the computer program and cause the apparatus to implement the method according to any one of the possible embodiments in the second aspect.

According to a fourth aspect, a readable storage medium is provided. The readable storage medium stores a computer program. When executed by a computing device, the computer program causes the computing device to implement the method according to any one of the possible embodiments in the second aspect.

BRIEF DESCRIPTION OF DRAWINGS

To describe the technical solutions of some embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

8

Figure 5:
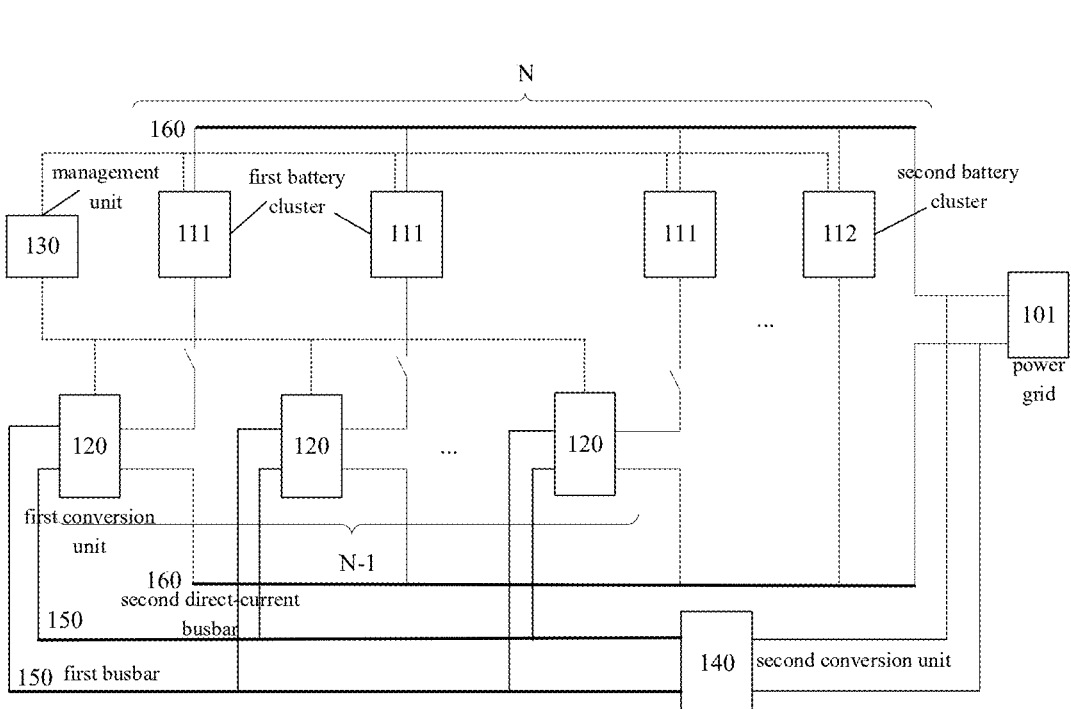
Figure 6:
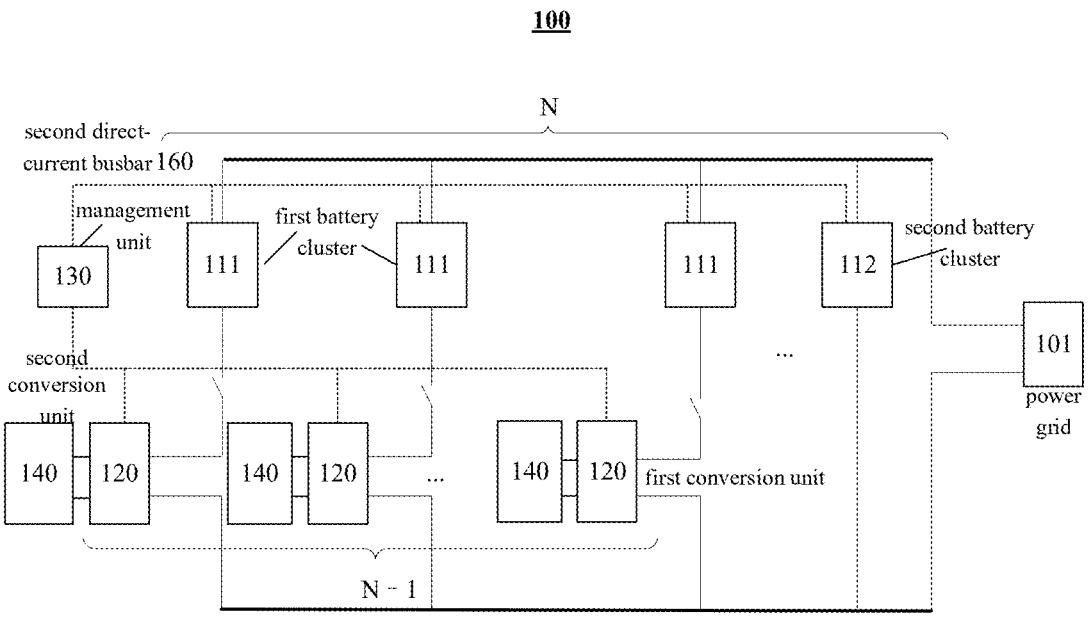
Figure 7:
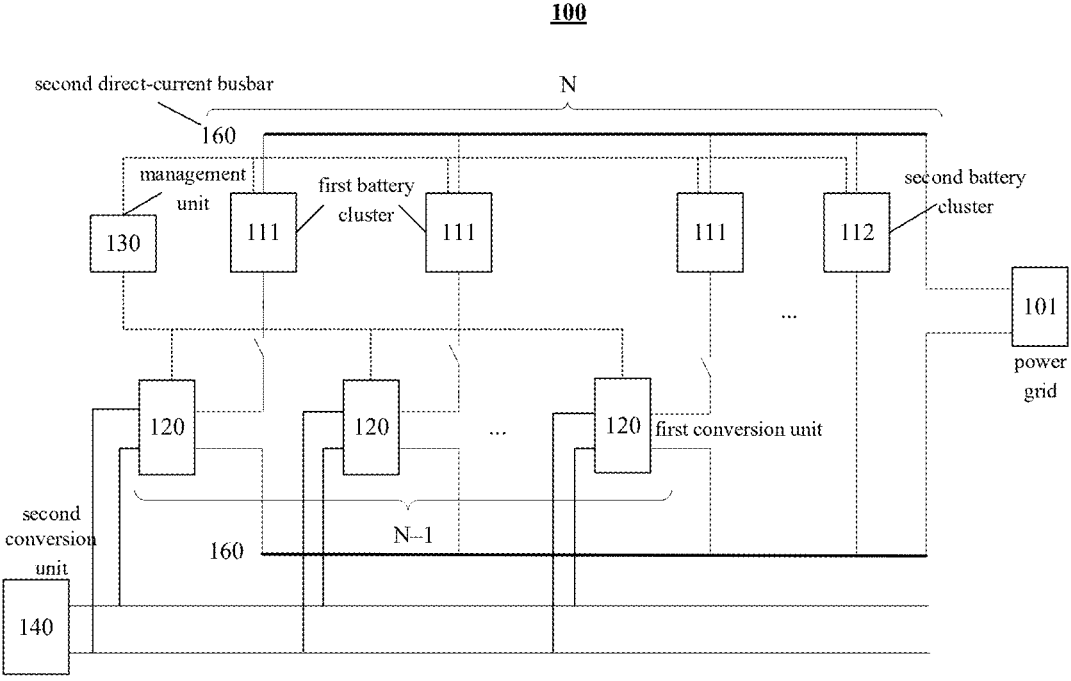
Figures 8, 9:
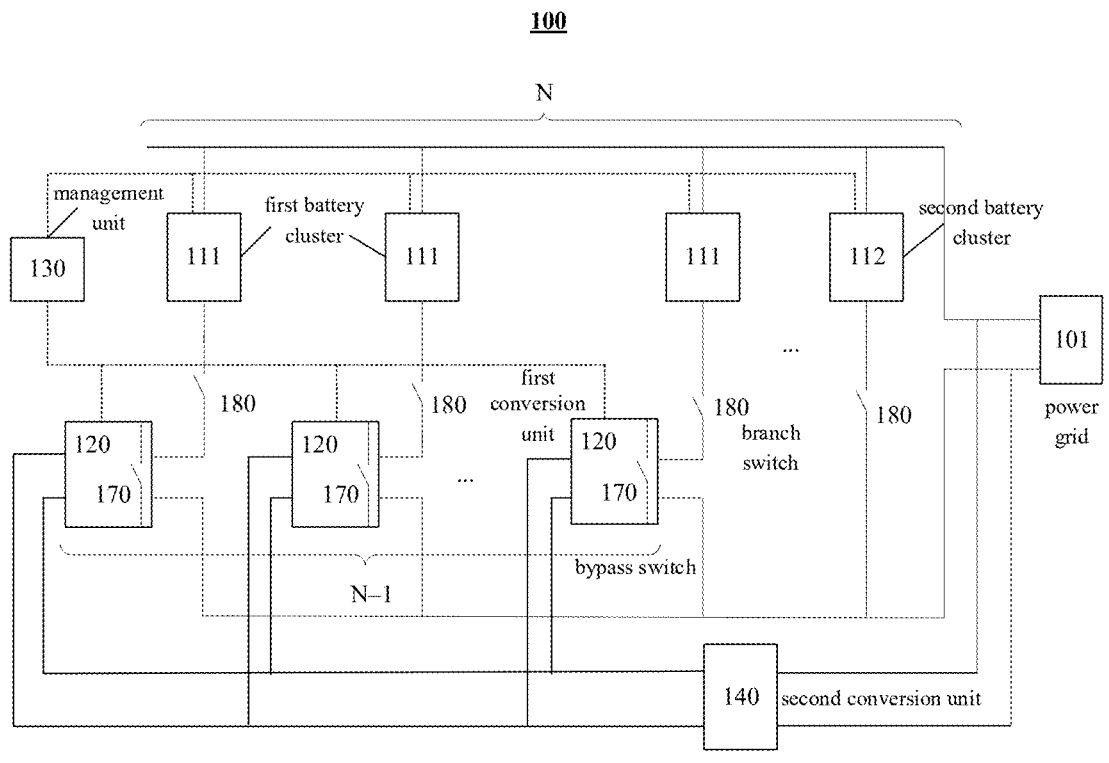
Figure 10:
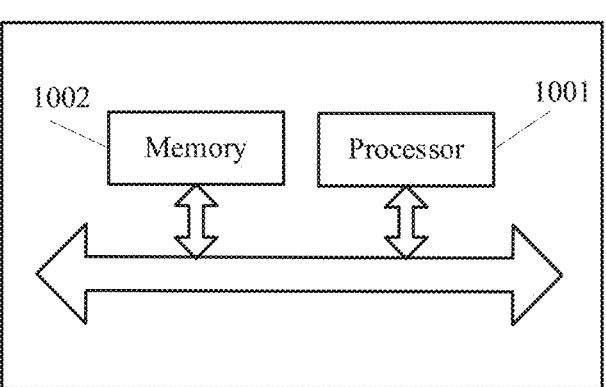

FIG. 5 is a schematic block diagram of an energy storage system according to another embodiment of this application;

FIG. 6 is a schematic block diagram of an energy storage system according to still another embodiment of this application;

FIG. 7 is a schematic block diagram of an energy storage system according to still another embodiment of this application;

FIG. 8 is a schematic block diagram of an energy storage system according to still another embodiment of this application;

FIG. 9 is a schematic flowchart of an energy storage system control method according to an embodiment of this application; and FIG. 10 is a schematic block diagram of an energy storage system control apparatus according to an embodiment of this application.

The drawings are not drawn to scale.

DETAILED DESCRIPTION OF EMBODIMENTS

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of the present disclosure without making any creative effort fall within the protection scope of the present disclosure.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned device or component is necessarily located in the specified direction and position or constructed or operated in the specified direction and position. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

In this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that an embodiment described in this application may be combined with another embodiment.

A battery cluster in this application means a combination of batteries connected in series, parallel, or series-and-parallel pattern. The series-and-parallel pattern means a combination of series connection and parallel connection. For example, a battery cluster in this application may be formed by a plurality of batteries connected in series or in parallel. For another example, a battery cluster in this application may be formed by a plurality of batteries connected in parallel first and then connected in series. The battery means a unitary physical module that includes one or more battery cells to provide a higher voltage and a higher capacity. For example, the battery may be a battery module or a battery pack.

Optionally, the battery in some embodiments of this application may be a lithium-ion battery, a lithium metal battery, a lead-acid battery, a nickel-cadmium battery, a nickel-hydrogen battery, a lithium-sulfur battery, a lithium-air battery, a sodium-ion battery, or the like. The type of the battery is not particularly limited herein.

In most energy storage systems, the system capacity needs to be increased by connecting battery clusters in parallel. However, due to differences in the capacity of each individual battery in a cluster, the internal resistance of the cluster, and the like, the State of Charge (SOC, also known as remaining charge) generally differs between the battery clusters. In addition, the actual operating ambient temperature of the battery cluster is unable to keep consistent between the battery clusters, thereby leading to unavoidable mismatch of the SOC or cluster voltage between the battery clusters when a plurality of battery clusters are connected in parallel. When the battery cluster with a relatively small internal resistance is fully charged or fully discharged, other battery clusters need to stop charging or discharging. Consequently, other battery clusters are unable to be fully charged or fully discharged, thereby causing capacity loss and performance deterioration of the batteries, accelerating battery attenuation, and reducing the available capacity of the entire energy storage system.

Therefore, in the related art, battery clusters are generally connected in parallel directly by increasing a current protection value. In other words, the battery clusters are connected in parallel directly in a case that the current of the battery clusters does not exceed the current protection value. However, this manner in the related art is defective in: (i) the voltage difference between the battery clusters to be connected in parallel needs to be as small as possible, and, if the voltage difference is excessive, an impact current caused by the parallel connection may be greater than the preset overcurrent protection value; and (ii) a very large circulating current still exists between the battery clusters connected in parallel, thereby posing a high risk of damaging the battery clusters.

In addition, a DC-to-DC converter may be disposed in a power transmission branch circuit of each battery cluster. The SOC is equalized between different battery clusters by the direct current to direct current (DC-to-DC) converter to achieve SOC equalization between the battery clusters. This keeps the available capacity always consistent between different battery clusters, and also tolerates voltage asynchronization between the battery clusters of the DC-to-DC converter, thereby solving the problem of mismatch caused by parallel connection between different battery clusters. However, in this technical solution, the DC-to-DC converter is disposed in the power transmission branch circuit of the battery cluster, thereby inevitably leading to an additional level of power transmission loss. Therefore, this technical solution not only leads to a severe loss of efficiency, but also brings about a problem of a high cost of heat dissipation. In addition, this technical solution also leads to a high design range of the DC-to-DC converter in terms of the power capacity, the input voltage, and the output voltage, and results in a high cost of the energy storage system.

In view of the above situation, an embodiment of this application provides an energy storage system, including N-X first battery clusters equipped with a first conversion unit and X second battery clusters not equipped with the first conversion unit. Benchmarked against the second battery clusters, the corresponding abnormal first battery cluster is regulated by use of the first conversion unit, thereby equalizing electrical parameters of the battery clusters connected in parallel, and in turn, maximally enhancing the capacity and performance of the energy storage system. In addition, just N-X battery clusters among N battery clusters are equipped with the first conversion unit, thereby reducing the loss, cost, and the like of the entire system.

Figure 1:
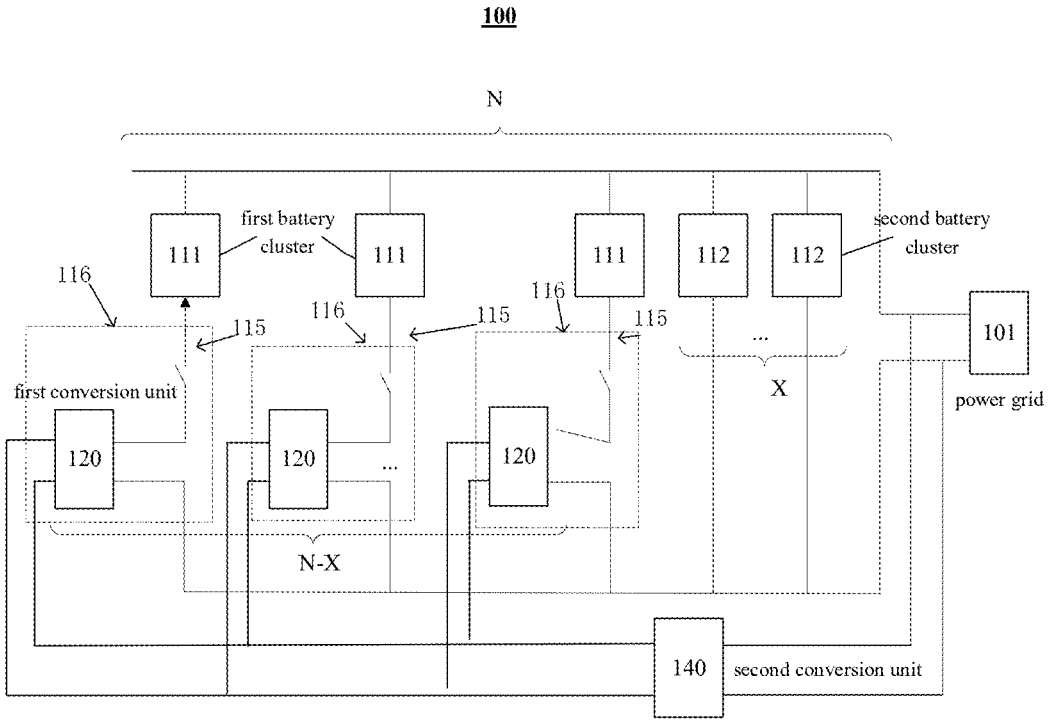
FIG. 1 is a schematic block diagram of an energy storage system according to an embodiment of this application.

FIG. 1 is a schematic block diagram of an energy storage system according to an embodiment of this application. As shown in FIG. 1, the energy storage system includes N battery clusters 110 and N-X first conversion units 120, where N is a positive integer greater than 1 and X is a positive integer less than N. A first side of each of N-X first conversion units 120 is connected in series to a power transmission circuit 115 of one of N-X first battery clusters 111 among the N battery clusters 110, so as to combine with a corresponding first battery cluster 111 to form a series branch circuit 116. The N-X series branch circuits 116 are connected in parallel to X second battery clusters 112 in the N battery clusters 110.

The N battery clusters 110 are connected in parallel to each other. Each battery cluster 110 of the N battery clusters 110 may include at least one battery. The at least one battery may be connected to each other in series or in series-and-parallel pattern.

In the above technical solution, the N battery clusters 110 include N-X first battery clusters 111 and X second battery clusters 112. Each first battery cluster 111 among the N-X first battery clusters 111 is connected in series to the first conversion unit 120, so as to form N-X series branch circuits. The N-X series branch circuits are then connected in parallel to X second battery clusters 112. The energy storage system 100 regulates the corresponding first battery clusters 111 through the N-X first conversion units 120 in the N-X series branch circuits, thereby not only reducing or even avoiding the current circulation between the N battery clusters 110 on the one hand, maintaining the consistency between the N battery clusters 110, and in turn, maximally enhancing the capacity and performance of the energy storage system 100. On the other hand, just N-X first battery clusters 111 in the energy storage system 100 are equipped with the first conversion unit 120, thereby relatively reducing the loss, cost, size, and weight of the energy storage system 100.

Figure 2:
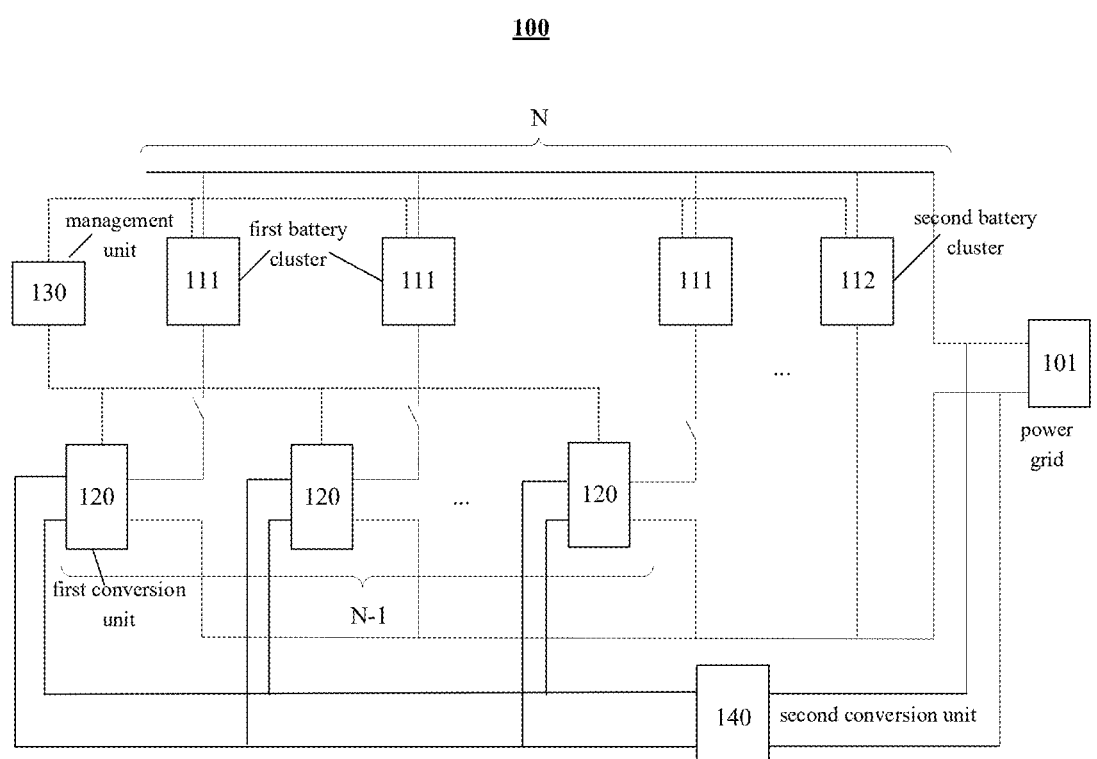
FIG. 2 is a schematic block diagram of an energy storage system according to another embodiment of this application.

FIG. 2 is a schematic block diagram of an energy storage system 100 according to another embodiment of this application. As shown in FIG. 2, the energy storage system 100 further includes a management unit 130. The management unit 130 is configured to control, based on status of the series branch circuit, the first conversion unit 120 to regulate a voltage of the first battery cluster 111 corresponding to the first conversion unit 120.

The management unit 130 may be, but is not limited to, a battery management system (BMS) or a battery management unit (BMU). The BMS or BMU can monitor an operating parameter of each battery cluster 110 and other components in the energy storage system 100, and, based on the operating parameter, control the first conversion unit 120 in the energy storage system 100.

In the above technical solution, the N battery clusters 110 include N-X first battery clusters 111 each equipped with the first conversion unit 120, and X second battery clusters 112 not equipped with the first conversion unit 120. Benchmarked against the X second battery clusters 112, the corresponding first battery cluster 111 is regulated by use of the first conversion unit 120 to reduce the error between the first battery cluster 111 and the X second battery clusters 112, thereby maintaining consistency of the entire energy storage system 100. The management unit 130 controls all the first conversion units 120 to regulate the voltages of the first battery clusters 111 corresponding to the first conversion units 120, thereby improving the regulation efficiency of the energy storage system 100.

In the block diagram of the energy storage system 100 shown in FIG. 2, X is 1. However, in some other embodiments, X may be 2, 3, or the like instead. The value of X is not limited herein.

In some embodiments, the management unit 130 is configured to: control, in a case that a voltage difference between the series branch circuit and the X second battery clusters 112 is greater than a first threshold, the first conversion unit 120 to regulate the voltage of the corresponding first battery cluster 111 so that a voltage difference between the first battery cluster 111 corresponding to the first conversion unit 120 and the X second battery clusters 112 is less than the first threshold, and control the series branch circuit to be connected in parallel to the X second battery clusters 112.

It is hereby noted that the first threshold may be set based on actual conditions, and the value of the first threshold is not particularly limited herein.

When the voltage difference between the series branch circuit and the X second battery clusters 112 is greater than the first threshold, the voltage difference between the series branch circuit and the X second battery clusters 112 has already caused an internal circulating current in the energy storage system 100, and has caused an impact on the performance of the energy storage system 100. The first battery cluster 111 in this series branch circuit is an abnormal battery cluster 110.

In the above technical solution, when the voltage difference between the series branch circuit and the X second battery clusters 112 is greater than the first threshold, the management unit 130 controls the first conversion unit 120 to regulate the voltage of the corresponding first battery cluster 111 to reduce the voltage difference between the abnormal first battery cluster 111 and the X second battery clusters 112, thereby ensuring the equalization and safety of the energy storage system 100.

In some embodiments, the management unit 130 is configured to: control, in a case that a voltage difference between the series branch circuit and the X second battery clusters 112 is less than a first threshold, the series branch circuit to be connected in parallel to the X second battery clusters 112.

When the voltage difference between the series branch circuit and the X second battery clusters 112 is less than the first threshold, the impact caused by the voltage difference onto the performance of the energy storage system 100 is negligible.

In the above technical solution, the management unit 130 controls the series branch circuit to be directly connected in parallel to the energy storage system 100, where the voltage difference between the series branch circuit and the X second battery clusters 112 is less than the first threshold, thereby ensuring high capacity and performance of the energy storage system 100.

Further, a third threshold (the third threshold is greater than the first threshold) may be further set in a practical application process. The third threshold is a maximum voltage tolerable by the first conversion unit 120. In other words, if the voltage difference between the series branch circuit and the X second battery clusters 112 falls between the first threshold and the third threshold, the management unit 130 controls the first conversion unit 120 to regulate the voltage of the corresponding first battery cluster 111 to reduce the voltage difference between the abnormal first battery cluster 111 and the X second battery clusters 112. If the voltage difference between the series branch circuit and the X second battery clusters 112 is greater than the third threshold, indicating that the voltage difference exceeds the regulation capability of the first conversion unit 120, then it is not appropriate to connect the series branch circuit in parallel to the system, with the voltage difference being so large between the series branch circuit and the X second battery clusters 112.

It is hereby noted that a fourth threshold, a fifth threshold, and so on may be set based on the actual situation in practical applications, and the settings of the thresholds are not limited herein.

In some embodiments, the management unit 130 is configured to: control, in a case that a SOC difference between the series branch circuit and the X second battery clusters 112 is greater than a second threshold, the first conversion unit 120 to regulate the current of the corresponding first battery cluster so that a SOC difference between the first battery cluster 111 corresponding to the first conversion unit 120 and the X second battery clusters 112 is less than the second threshold, and control the series branch circuit to be connected in parallel to the X second battery clusters 112.

It is hereby noted that the second threshold may also be set based on actual conditions, and the value of the second threshold is not limited herein.

Figure 3:
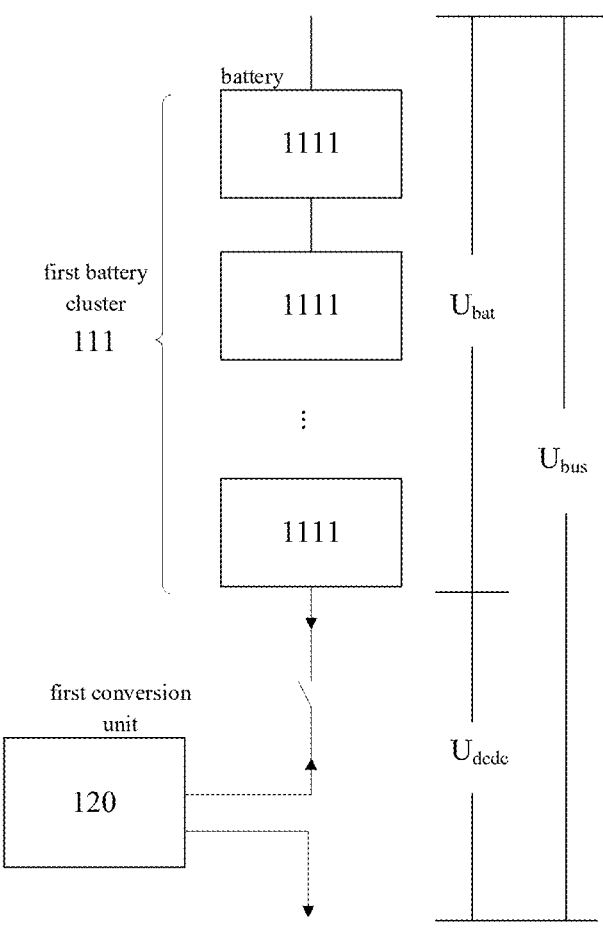
FIG. 3 is a schematic structural diagram of a series branch circuit according to an embodiment of this application.

FIG. 3 is a schematic structural diagram of a series branch circuit according to an embodiment of this application. As shown in FIG. 3, the first battery cluster 111 is formed by a plurality of batteries 1111 connected in series. The voltage of the first battery cluster 111 is denoted as $U_{bat}$, and the voltage of the first conversion unit 120 is denoted as $U_{dcdc}$. The first conversion unit 120 and the first battery cluster 111 may be connected in series across a busbar. The voltage of the busbar is denoted as $U_{bus}$.

During charging of the energy storage system 100, the current I of the first battery cluster 111 is equal to $(U_{bus}-U_{dcdc}-U_{bat})/R$. During discharging of the energy storage system 100, the current I of the first battery cluster 111 is equal to $(U_{dcdc}+U_{bat}U_{bus})/R$, where R is a total resistance of the series branch circuit formed by the first conversion unit 120 and the first battery cluster 111. The total resistance R may include a resistance of the first battery cluster 111, a resistance of the first conversion unit 120, a resistance of a connection line, and the like. The resistance of the first battery cluster 111 is relatively large.

Therefore, when the voltage of the first conversion unit 120 is regulated, the current of the first battery cluster 111 is regulated and changed accordingly, and other electrical parameters of the first battery cluster 111, such as the voltage and the SOC, are also regulated and changed accordingly.

The voltage and SOC of the first battery cluster 111 can accurately reflect the status of the first battery cluster 111 during charging and discharging, and can be easily monitored by other electrical components such as a BMS or a BMU. After the N-X first conversion units 120 regulate the voltage or SOC of the N-X first battery clusters 111 to an equalized state, the overall capacity and performance of the N battery clusters 110 can be effectively enhanced considerably during charging and discharging of the energy storage system 100.

In the above technical solution, when the SOC difference between the series branch circuit and the X second battery clusters 112 is greater than the second threshold, the SOC of the branch circuit is abnormal. By controlling the first conversion unit 120, the management unit 130 can directly regulate the SOC of the first battery cluster 111 of the branch circuit to a value that is substantially the same as the SOC of the X second battery clusters 112, so as to most intuitively ensure a stabilized capacity of the first battery cluster 111, and in turn, effectively ensure high charge-and-discharge performance of all the battery clusters 110 in the energy storage system 100.

In some embodiments, the management unit 130 is further configured to: control, in a case that a SOC difference between the series branch circuit and the X second battery clusters 112 is less than or equal to a second threshold, the series branch circuit to be connected in parallel to the X second battery clusters 112.

In the above technical solution, when the SOC difference between a series branch circuit and the X second battery clusters 112 is not greater than the second threshold, the SOC difference between the series branch circuit and the X second battery clusters 112 causes no impact onto the energy storage system 100, and the series branch circuit can be directly connected in parallel into the energy storage system 100.

In the above technical solution, the management unit 130 controls the series branch circuit to be directly connected in parallel into the energy storage system 100, where the SOC difference between the series branch circuit and the X second battery clusters 112 is not greater than the second threshold, thereby improving the efficiency of the energy storage system 100 in regulating the abnormal first battery cluster 111.

In some embodiments, a regulation manner of the current $I_2$ is:

$$I_2 = I + f(\Delta SOC).$$

In a case that $\Delta SOC$ is greater than 0, $$f(\Delta SOC) = k * ((1 + \Delta SOC)^n - 1).$$

Alternatively, in a case that $\Delta SOC$ is less than 0, $$f(\Delta SOC) = -k * ((1 + \Delta SOC)^n - 1).$$

In the formulas above, $\Delta SOC$ is the SOC difference between the first battery cluster corresponding to the first conversion unit and the X second battery clusters, I is an average cluster current of the X second battery clusters, k is a linear coefficient, and n is a power exponent.

As an example, when X is 1, the SOC of this second battery cluster 112 is the SOC of the X second battery clusters 112; and, when X is 2 or another value, the SOC of the X second battery clusters 112 may be a mean or median value of the X second battery clusters 112.

In this embodiment of this application, the linear coefficient k and the power exponent n are two preset constants. Both constants are related to the power regulation capability of the first conversion unit 120 and/or the ampacity of the N battery clusters 110. Specifically, the power regulation capability of the first conversion unit 120 may depend on a maximum output power and a minimum output power of the first conversion unit 120. The ampacity of the N battery clusters 110 may depend on a maximum current that each battery cluster 110 among the N battery clusters 110 can withstand.

It is hereby noted that, as the values of the preset constants k and n increase, the following two conditions need to be satisfied: (1) the first conversion unit 120 needs to satisfy the power regulation capability of the corresponding current change; and (2) the total power of the energy storage system 100 in a specified mode is constant, and, when the current of the first battery cluster 111 is regulated individually, the currents of other battery clusters will be passively regulated accordingly so as to satisfy the total power. During regulation of the current of the first battery cluster 111, attention needs to be paid to both the ampacity of the first battery cluster 111 and the ampacity of other impacted battery clusters.

In this embodiment of this application, $I_2$ is a current value to which the first conversion unit 120 needs to regulate the first battery cluster 111.

In the above technical solution, the current $I_2$ and the SOC calculated by use of the formula may correspond to the SOC of the X second battery clusters 112 to a high degree of correspondence, thereby enabling the energy storage system 100 to quickly regulate the SOC of the first battery cluster 111 to the SOC of the X second battery clusters 112 based on the current, and in turn, enhancing the efficiency of the energy storage system 100 in regulating the abnormal battery cluster.

In some embodiments, a regulation manner of the current $I_2$ is:

$$I_2 = k * I.$$

In a case that $\Delta SOC$ is greater than 0 in a charging process, a value range of k is 0 to 1.

Alternatively, in a case that $\Delta SOC$ is less than 0 in a charging process, a value range of k is 1 to 100.

Alternatively, in a case that $\Delta SOC$ is greater than 0 in a discharging process, a value range of k is 1 to 100.

Alternatively, in a case that $\Delta SOC$ is less than 0 in a discharging process, a value range of k is 0 to 1.

$\Delta SOC$ is the SOC difference between the first battery cluster corresponding to the first conversion unit and the X second battery clusters, and I is an average cluster current of the X second battery clusters.

In the above technical solution, by means of the above formulas, the management unit 130 can determine different currents $I_2$ based on different formulas in a case that the SOC difference $\Delta SOC$ between the first battery cluster 111 in the abnormal series branch circuit and the X second battery clusters 112 varies and that the energy storage system 100 is in different states. The formula is easy to operate, and also takes into account the average cluster current I of the X second battery clusters 112, thereby enabling the abnormal first battery cluster 111 to be quickly regulated, ensuring equalization between all the N battery clusters 110 in the energy storage system 100, and in turn, improving the efficiency of the energy storage system 100 in regulating the first battery cluster 111.

By regulating the current in the above two manners, during charging of the energy storage system 100, the charging for a high-capacity battery cluster 110 can be slowed down, or the charging for a low-capacity battery cluster 110 can be quickened. During discharging of the energy storage system 100, the discharging for a high-capacity battery cluster 110 can be quickened, or the discharging for a low-capacity battery cluster 110 can be slowed down.

Figure 4:
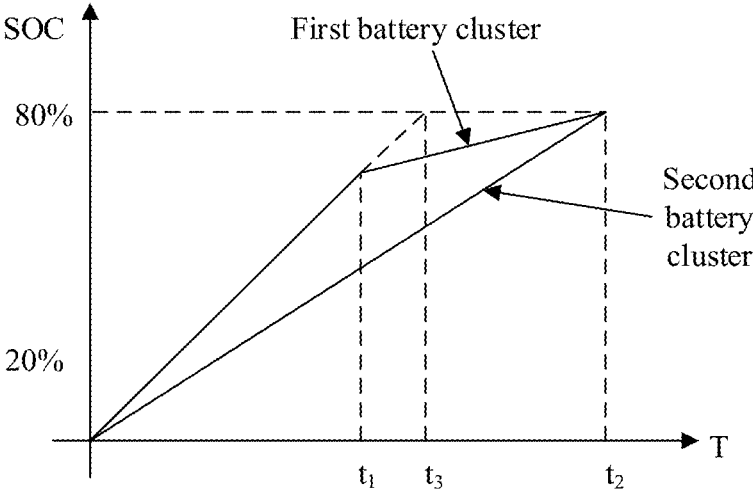
FIG. 4 is a SOC curve of a battery cluster according to an embodiment of this application.

FIG. 4 is a SOC curve of a battery cluster according to an embodiment of this application. Specifically, the energy storage system 100 may be in a charging state, in which the SOC of the first battery cluster 111 and the second battery cluster 112 may gradually increase over time.

In a case that the management unit 130 detects that the first battery cluster 111 is an abnormal battery cluster and that a charging rate of the first battery cluster 111 is fast, the management unit 130 may regulate the first battery cluster 111 at a time point $t_1$ to slow down the charging rate of the first battery cluster 111, that is, to make the increase speed of the SOC of the first battery cluster 111 slow down over time. Both the SOC of the first battery cluster 111 and the SOC of the second battery cluster 112 may reach 80% at the time point $t_2$.

In the embodiment shown in FIG. 4, if the abnormal first battery cluster 111 is not regulated, the charging time of the energy storage system 100 depends on the charging time of the first battery cluster 111. The SOC of the first battery cluster 111 reaches 80% at the time point $t_3$. If the charging for the energy storage system 100 is stopped at this time point, the SOC of the second battery cluster 112 at the time point $t_3$ is much less than 80%, thereby impairing the charging capacity of the energy storage system 100.

Understandably, for an energy storage system 100 in a discharging state, the abnormal battery cluster 110 also impairs the discharging capacity of the energy storage system 100, and prevents at least a part of the battery clusters 110 in the energy storage system 100 from being fully discharged, thereby impairing the durability of the energy storage system 100.

By regulating the abnormal battery cluster in the energy storage system 100 in the manner disclosed in this embodiment of this application, the charging for a high-capacity battery cluster 110 in the energy storage system 100 is slowed down or the charging for a low-capacity battery cluster 110 is quickened; or, the discharging for a high-capacity battery cluster 110 is quickened, or the discharging for a low-capacity battery cluster 110 is slowed down, thereby equalizing the capacity between the battery clusters 110 in the energy storage system 100, ensuring high charge-and-discharge performance of the energy storage system 100, and enabling the energy storage system to be discharged and charged for more cycles.

In some embodiments, the energy storage system 100 further includes a second conversion unit 140. A first side of the second conversion unit 140 is connected to a power grid 101. A second side of the second conversion unit 140 is connected to a second side of the first conversion unit 120.

In an embodiment of this application, a power source of the environment in which the energy storage system 100 is located, taking the power grid 101 as an example, is generally a high-voltage power source. The power source may also be referred to as a high-voltage end. An end of the battery cluster 110, at which the battery cluster is connected in series to the first conversion unit 120, is of relatively low voltage. The end of the battery cluster 110, at which the battery cluster is connected in series to the first conversion unit 120, may be referred to as a low-voltage end. To implement the function of regulating the battery cluster 110 (the low-voltage end), the power source generally needs to undergo a first-stage step-down process by the second conversion unit 140, so as to enable the first conversion unit 120 to effectively and safely regulate the electrical parameters such as voltage and current of the corresponding first battery cluster 111.

Alternatively, in a case of the power source is relatively small, the second conversion unit 140 may flexibly boost and regulate the voltage of the power source to enable the first conversion unit 120 to effectively and reliably regulate the first battery cluster 111.

Specifically, the voltage obtained through conversion by the second conversion unit 140 may be used as an input voltage of the first conversion unit 120. The first conversion unit 120 may generate an output voltage based on the input voltage, and then regulate the electrical parameters of the first battery cluster 111 connected in series to the first conversion unit.

FIG. 5 is a schematic block diagram of an energy storage system according to another embodiment of this application. As shown in FIG. 5, the second conversion unit 140 and the first conversion unit 120 may be implemented by a first busbar 150, such as an alternating-current bus (not shown in the drawing) or a direct-current busbar 150 shown in FIG. 5. In addition, both ends of each series branch circuit are connected in parallel to a second direct-current busbar 160. A direct-current side of the second conversion unit 140 is also connected to the second direct-current busbar 160. An alternating-current side of the second conversion unit is configured to be directly or indirectly connected to the power grid and/or a load, and/or, configured to assist in supplying power.

Specifically, in this embodiment of this application, the power source of the second conversion unit 140 may be the second direct-current busbar 160. The busbar can implement the transmission of electrical energy between the N battery clusters 110 and the outside.

Generally, the voltage on this second direct-current busbar 160 is relatively high. Therefore, the voltage is converted by the second conversion unit 140 in this embodiment of this application to ensure high regulation performance of the first conversion unit 120. Further, the power source of the second conversion unit 140 is reused as the busbar of the N battery clusters 110, thereby avoiding the use of an additional power source, and reducing the cost of the energy storage system 100 on the basis of ensuring a good regulation effect on the N battery clusters 110.

In the above technical solution, a second conversion unit 140 is further connected between the power grid 101 and each series branch circuit. The second conversion unit 140 converts the voltage between the power grid 101 and the N battery clusters 110 appropriately, thereby further reducing the loss of the whole energy storage system 100.

In some embodiments, in a case that the first conversion unit 120 is a DC-to-DC converter and the second conversion unit 140 is a DC-to-DC converter, the second conversion unit 140 is connected to a direct-current side of the power grid 101.

In the above technical solution, when both the first conversion unit 120 and the second conversion unit 140 are DC-to-DC converters, the second conversion unit 140 is caused to be connected to the direct-current side of the power grid 101 to ensure normal functions of the energy storage system 100.

In some embodiments, in a case that the first conversion unit 120 is a DC-to-DC converter and the second conversion unit 140 is a DC-to-AC converter, the second conversion unit 140 is connected to an alternating-current side of the power grid 101.

In the above technical solution, when the first conversion unit 120 is a DC-to-DC converter and the second conversion unit 140 is a DC-to-AC converter, the second conversion unit 140 is caused to be connected to the alternating-current side of the power grid 101 to ensure normal functions of the energy storage system 101.

FIG. 6 is a schematic block diagram of an energy storage system according to still another embodiment of this application. As shown in FIG. 6, in a case that the first conversion unit 120 is a DC-to-DC converter and the second conversion unit 140 is a direct-current power source, each first conversion unit 120 is equipped with one second conversion unit 140.

In the above technical solution, when the first conversion unit 120 is a DC-to-DC converter, by causing the second conversion unit 140 to be a direct-current power source and equipping each first conversion unit 120 with a second conversion unit 140 separately, the second conversion unit 140 directly provides the desired voltage to each first conversion unit 120, thereby regulating each series branch circuit accurately and achieving further equalization of the energy storage system 100.

FIG. 7 is a schematic block diagram of an energy storage system according to still another embodiment of this application. As shown in FIG. 7, in a case that the first conversion unit 120 is a DC-to-DC converter and the second conversion unit 140 is a direct-current power source, the first conversion units 120 share one second conversion unit 140.

In the above technical solution, when the first conversion unit 120 is a DC-to-DC converter, by causing the second conversion unit 140 to be a direct-current power source and causing all the first conversion units 120 to share one second conversion unit 140, the second conversion unit 140 can provide a voltage to the series branch circuit directly, and the cost of the energy storage system 100 can be reduced.

In some embodiments, in a case that the first conversion unit 120 is a DC-to-AC converter and the second conversion unit 140 is an alternating-current power source, each first conversion unit 120 is equipped with one second conversion unit 140.

In the above technical solution, when the first conversion unit 120 is a DC-to-AC converter, by causing the second conversion unit 140 to be an alternating-current power source and equipping each first conversion unit 120 with a second conversion unit 140 separately, the second conversion unit 140 directly provides the desired voltage to each first conversion unit 120, thereby regulating each series branch circuit accurately and achieving further equalization of the energy storage system 100.

In some embodiments, in a case that the first conversion unit 120 is a DC-to-DC converter and the second conversion unit 140 is an alternating-current power source, the first conversion units 120 share one second conversion unit 140.

In the above technical solution, when the first conversion unit 120 is a DC-to-AC converter, by causing the second conversion unit 140 to be an alternating-current power source and causing all the first conversion units 120 to share one second conversion unit 140, the second conversion unit 140 can provide the desired voltage to the series branch circuit directly, and the cost of the energy storage system 100 can be further reduced.

In this embodiment of this application, the first conversion unit 120 is an isolated DC-to-DC converter or a non-isolated DC-to-DC converter, and/or the first conversion unit 120 is configured to output a positive voltage and/or a negative voltage.

In this embodiment of this application, the second conversion unit 140 may also be an isolated DC-to-DC converter or non-isolated DC-to-DC converter, and/or the second conversion unit 140 may also be configured to output a positive voltage and/or a negative voltage.

The technical solution disclosed in the above embodiment enables the first conversion unit 120 and second conversion unit 140 to be adaptable to more application scenarios and to achieve higher performance of regulating the N battery clusters 110.

FIG. 8 is a schematic block diagram of an energy storage system according to still another embodiment of this application. As shown in FIG. 8, the energy storage system 100 further includes N-X bypass switches 170. The bypass switches 170 are configured to bypass the first conversion unit 120.

In this embodiment of this application, the energy storage system 100 further includes a bypass switch module. The bypass switch module includes a bypass switch 170. The bypass switch 170 is in one-to-one correspondence with the first conversion unit 120. In addition, the bypass switch module may further include other components that assist the bypass switch 170, such as a capacitor and a resistor. The specific structure of the bypass switch module or the bypass switch 170 is not limited herein. In addition, the bypass switch 170 may be, but is not limited to, a switch structure such as a relay. The specific type of the bypass switch 170 is not limited herein.

In the above technical solution, N-X bypass switches 170 are disposed in the energy storage system 100. That is, each first conversion unit 120 is equipped with a bypass switch 170 separately. With the bypass switches 170 disposed, the first battery clusters 111 corresponding to the N-X first conversion units 120 in the energy storage system 100 can be regulated and controlled more flexibly.

In some embodiments, the bypass switches 170 are built into the first conversion unit 120.

In this embodiment of this application, the bypass switches 170 may be built in the first conversion units 120, or disposed externally on the first conversion units 120. The built-in bypass switches can be operated directly, and the external bypass switches are inexpensive. Whether the bypass switches 170 are built-in or disposed externally depends on actual requirements, and is not particularly limited herein.

In the above technical solution, the bypass switch 170 is configured to bypass the first conversion unit 120, so as to more flexibly regulate and control the first battery cluster 111 corresponding to the first conversion unit 120. The bypass switch 170 built into the first conversion unit 120 plays the role of the bypass switch 170 itself and also reduces the area occupied by the bypass switch 170, thereby further reducing the size of the energy storage system 100.

In some embodiments, as shown in FIG. 8, the energy storage system 100 further includes N branch switches 180. Each of the branch switches 180 is disposed in a branch circuit at which each battery cluster 110 is located.

In an embodiment of this application, the energy storage system 100 further includes a branch switch module. The branch switch module includes a branch switch 180. The branch switch 180 is in one-to-one correspondence with the first conversion unit 120. In some embodiments, the branch switch module may further include, in addition to the N branch switches 180, other components that assist the branch switch 180, such as a capacitor and a resistor. The specific structure of the branch switch module is not limited herein. In addition, the branch switch 180 may be, but is not limited to, a switch structure such as a relay. The specific type of the branch switch 180 is not limited herein.

Each battery cluster 110 among the N battery clusters 110 may be connected in series through one branch switch 180 to form a series branch circuit, so that the series branch circuit is connected in parallel into the energy storage system 100.

It is hereby noted that, the management unit 130 can not only control the operation of the first conversion unit 120, but also control the closure of the bypass switch 170 and the branch switch 180, so as to enable the first conversion unit 120 to regulate the abnormal first battery cluster 110.

In the above technical solution, the energy storage system 100 includes N branch switches 180. The branch circuit in which each battery cluster 110 is located is equipped with a separate branch switch 180. That is, the branch switches 180 are in one-to-one correspondence with the battery clusters 110. In this way, parallel connection between N battery clusters 110 can be implemented by controlling the branch switches 180. The control manner is a simple and reliable.

In the above embodiment, the energy storage system 100 according to an embodiment of this application is described with reference to FIG. 1 to FIG. 8. The following describes an energy storage system control method according to an embodiment of this application with reference to FIG. 9.

Understandably, the method embodiment described below corresponds to the apparatus embodiment described above. For similar descriptions, reference may be made to the preceding embodiment.

FIG. 9 is a schematic flowchart of an energy storage system control method according to an embodiment of this application. The energy storage system includes N battery clusters, N-X first conversion units, and a management unit, where N is a positive integer greater than 1 and X is a positive integer less than N. A first side of each of N-X first conversion units is connected in series to a power transmission circuit of one of N-X first battery clusters among the N battery clusters, so as to combine with a corresponding first battery cluster to form a series branch circuit. The N-X series branch circuits are connected in parallel to X second battery clusters in the N battery clusters.

As shown in FIG. 9, the control method 200 may include the following step:

S210: Controlling, based on status of the series branch circuit, the first conversion unit to regulate a voltage of the first battery cluster corresponding to the first conversion unit.

Specifically, the control method 200 according to this embodiment of this application is applicable to the energy storage system 100 according to the preceding embodiment of this application. An entity for performing the control method 200 may be a management unit 130 in the energy storage system 100.

In some embodiments, in a case that a voltage difference between the series branch circuit and the X second battery clusters is greater than a first threshold, the first conversion unit is controlled to regulate the voltage of the corresponding first battery cluster so that a voltage difference between the first battery cluster corresponding to the first conversion unit and the X second battery clusters is less than the first threshold.

In some embodiments, the method 200 further includes: controlling, in a case that a voltage difference between the series branch circuit and the X second battery clusters is less than a first threshold, the series branch circuit to be connected in parallel to the X second battery clusters.

In some embodiments, in a case that a SOC difference between the series branch circuit and the X second battery clusters is greater than a second threshold, the first conversion unit is controlled to regulate a current of the corresponding first battery cluster so that a SOC difference between the first battery cluster corresponding to the first conversion unit and the X second battery clusters is less than the second threshold.

In some embodiments, the method further includes: controlling, in a case that a SOC difference between the series branch circuit and the X second battery clusters is less than or equal to a second threshold, the series branch circuit to be connected in parallel to the X second battery clusters.

In some embodiments, a regulation manner of the current $I_2$ is:

$$I_2 = I + f(\Delta SOC).$$

In a case that $\Delta SOC$ is greater than 0, $$f(\Delta SOC) = k * ((1 + \Delta SOC)^n - 1).$$

Alternatively, in a case that $\Delta SOC$ is less than 0, $$f(\Delta SOC) = -k * ((1 + \Delta SOC)^n - 1).$$

In the formulas above, $\Delta SOC$ is the SOC difference between the first battery cluster corresponding to the first conversion unit and the X second battery clusters, I is an average cluster current of the X second battery clusters, k is a linear coefficient, and n is a power exponent.

In some embodiments, a regulation manner of the current $I_2$ is:

$$I_2 = k * I.$$

In a case that $\Delta SOC$ is greater than 0 in a charging process, a value range of k is 0 to 1.

Alternatively, in a case that $\Delta SOC$ is less than 0 in a charging process, a value range of k is 1 to 100.

Alternatively, in a case that $\Delta SOC$ is greater than 0 in a discharging process, a value range of k is 1 to 100.

Alternatively, in a case that $\Delta SOC$ is less than 0 in a discharging process, a value range of k is 0 to 1.

$\Delta SOC$ is the SOC difference between the first battery cluster corresponding to the first conversion unit and the X second battery clusters, and I is an average cluster current of the X second battery clusters.

An embodiment of this application further provides an energy storage system control apparatus. As shown in FIG. 10, the energy storage system control apparatus 10 includes a processor 1001 and a memory 1002. The memory 1002 is configured to store a computer program. The processor 1001 is configured to call the computer program and cause the apparatus 10 to implement the method according to any one of various embodiments of this application.

An embodiment of this application further provides a readable storage medium. The readable storage medium stores a computer program. When executed by a computing device, the computer program causes the computing device to implement the method according to any one of various embodiments of this application.

Although this application has been described with reference to exemplary embodiments, various improvements may be made to the embodiments without departing from the scope of this application, and some components described in the embodiments may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. An energy storage system, wherein the energy storage system comprises N battery clusters and N-X first conversion units, wherein N is a positive integer greater than 1 and X is a positive integer less than N;

a first side of each of N-X first conversion units is connected in series to a power transmission circuit of one of N-X first battery clusters among the N battery clusters, so as to combine with a corresponding first battery cluster to form a series branch circuit of N-X series branch circuits; and the N-X series branch circuits are connected in parallel to X second battery clusters in the N battery clusters, wherein each of the X second battery clusters is not connected in series to a first conversion unit;

the energy storage system further comprises a management unit, wherein the management unit is configured to control, based on status of the series branch circuit, the first conversion unit to regulate a voltage of the first battery cluster corresponding to the first conversion unit;

the management unit is configured to:

control, in a case that a voltage difference between the series branch circuit and the X second battery clusters is less than a first threshold, the series branch circuit to be connected in parallel to the X second battery clusters;

the management unit is configured to:

control, in a case that a SOC difference between the series branch circuit and the X second battery clusters is greater than a second threshold, the first conversion unit to regulate a current of the corresponding first battery cluster so that a SOC difference between the first battery cluster corresponding to the first conversion unit and the X second battery clusters is less than the second threshold, and control the series branch circuit to be connected in parallel to the X second battery clusters; and a regulation manner of a current $I_2$, which is a current value to which the first conversion unit needs to regulate the corresponding first battery cluster, is:

$$I_2 = I + f(\Delta SOC)$$

in a case that $\Delta SOC$ is greater than 0, $$f(\Delta SOC) = k * ((1 + \Delta SOC)^n - 1)$$

in a case that $\Delta SOC$ is less than 0, $$f(\Delta SOC) = -k * ((1 + \Delta SOC)^n - 1)$$

wherein $\Delta SOC$ is the SOC difference between the first battery cluster corresponding to the first conversion unit and the X second battery clusters, I is an average cluster current of the X second battery clusters, k is a linear coefficient, and n is a power exponent.

2. The energy storage system according to claim 1, wherein the management unit is configured to:

controlling, in a case that a voltage difference between the series branch circuit and the X second battery clusters is greater than a first threshold, the first conversion unit to regulate the voltage of the corresponding first battery cluster so that a voltage difference between the first battery cluster corresponding to the first conversion unit and the X second battery clusters is less than the first threshold, and controlling the series branch circuit to be connected in parallel to the X second battery clusters.

3. The energy storage system according to claim 1, wherein the management unit is further configured to:

control, in a case that a SOC difference between the series branch circuit and the X second battery clusters is less than or equal to a second threshold, the series branch circuit to be connected in parallel to the X second battery clusters.

4. The energy storage system according to claim 1, wherein the energy storage system further comprises a second conversion unit, wherein a first side of the second conversion unit is connected to a power grid, and a second side of the second conversion unit is connected to a second side of the first conversion unit.

5. The energy storage system according to claim 4, wherein, in a case that the first conversion unit is a DC-to-DC converter and the second conversion unit is a DC-to-DC converter, the second conversion unit is connected to a direct-current side of the power grid.

6. The energy storage system according to claim 4, wherein, in a case that the first conversion unit is a DC-to-DC converter and the second conversion unit is a DC-to-AC converter, the second conversion unit is connected to an alternating-current side of the power grid.

7. The energy storage system according to claim 4, wherein, in a case that the first conversion unit is a DC-to-DC converter and the second conversion unit is a direct-current power source, each first conversion unit is equipped with one second conversion unit.

8. The energy storage system according to claim 4, wherein, in a case that the first conversion unit is a DC-to-DC converter and the second conversion unit is a direct-current power source, the first conversion units share one second conversion unit.

9. The energy storage system according to claim 4, wherein, in a case that the first conversion unit is a DC-to-AC converter and the second conversion unit is an alternating-current power source, each first conversion unit is equipped with one second conversion unit.

10. The energy storage system according to claim 4, wherein, in a case that the first conversion unit is a DC-to-AC converter and the second conversion unit is an alternating-current power source, the first conversion units share one second conversion unit.

11. The energy storage system according to claim 1, wherein the energy storage system further comprises N-X bypass switches, wherein the bypass switches are configured to bypass the first conversion unit.

12. The energy storage system according to claim 11, wherein the bypass switches are built into the first conversion unit.

13. The energy storage system according to claim 1, wherein the energy storage system further comprises N branch switches, wherein each of the branch switches is disposed in a branch circuit at which each battery cluster is located.

14. An energy storage system, wherein the energy storage system comprises N battery clusters and N-X first conversion units, wherein N is a positive integer greater than 1 and X is a positive integer less than N;

a first side of each of N-X first conversion units is connected in series to a power transmission circuit of one of N-X first battery clusters among the N battery clusters, so as to combine with a corresponding first battery cluster to form a series branch circuit of N-X series branch circuits; and the N-X series branch circuits are connected in parallel to X second battery clusters in the N battery clusters, wherein each of the X second battery clusters is not connected in series to a first conversion unit;

wherein the energy storage system further comprises a management unit, wherein the management unit is configured to control, based on status of the series branch circuit, the first conversion unit to regulate a voltage of the first battery cluster corresponding to the first conversion unit;

the management unit is configured to:

control, in a case that a voltage difference between the series branch circuit and the X second battery clusters is less than a first threshold, the series branch circuit to be connected in parallel to the X second battery clusters;

the management unit is configured to:

control, in a case that a SOC difference between the series branch circuit and the X second battery clusters is greater than a second threshold, the first conversion unit to regulate a current of the corresponding first battery cluster so that a SOC difference between the first battery cluster corresponding to the first conversion unit and the X second battery clusters is less than the second threshold, and control the series branch circuit to be connected in parallel to the X second battery clusters; and a regulation manner of a current $I_2$, which is a current value to which the first conversion unit needs to regulate the corresponding first battery cluster, is:

$$I_2 = k * I$$

in a case that $\Delta SOC$ is greater than 0 in a charging process, a value range of k is 0 to 1; or in a case that $\Delta SOC$ is less than 0 in a charging process, a value range of k is 1 to 100; or in a case that $\Delta SOC$ is greater than 0 in a discharging process, a value range of k is 1 to 100; or in a case that $\Delta SOC$ is less than 0 in a discharging process, a value range of k is 0 to 1, wherein $\Delta SOC$ is the SOC difference between the first battery cluster corresponding to the first conversion unit and the X second battery clusters, and I is an average cluster current of the X second battery clusters.

15. An energy storage system control method, wherein the energy storage system comprises N battery clusters, N-X first conversion units, and a management unit, wherein N is a positive integer greater than 1 and X is a positive integer less than N; a first side of each of N-X first conversion units is connected in series to a power transmission circuit of one of N-X first battery clusters among the N battery clusters, so as to combine with a corresponding first battery cluster to form a series branch circuit of N-X series branch circuits; the N-X series branch circuits are connected in parallel to X second battery clusters in the N battery clusters; and the method comprises:

controlling, based on status of the series branch circuit, the first conversion unit to regulate a voltage of the first battery cluster corresponding to the first conversion unit, wherein each of the X second battery clusters is not connected in series to a first conversion unit;

the energy storage system further comprises a management unit, wherein the management unit is configured to control, based on status of the series branch circuit, the first conversion unit to regulate a voltage of the first battery cluster corresponding to the first conversion unit;

the management unit is configured to:

control, in a case that a voltage difference between the series branch circuit and the X second battery clusters is less than a first threshold, the series branch circuit to be connected in parallel to the X second battery clusters;

the management unit is configured to:

control, in a case that a SOC difference between the series branch circuit and the X second battery clusters is greater than a second threshold, the first conversion unit to regulate a current of the corresponding first battery cluster so that a SOC difference between the first battery cluster corresponding to the first conversion unit and the X second battery clusters is less than the second threshold, and control the series branch circuit to be connected in parallel to the X second battery clusters; and a regulation manner of a current $I_2$, which is a current value to which the first conversion unit needs to regulate the corresponding first battery cluster, is:

$$I_2 = I + f(\Delta SOC)$$

in a case that $\Delta SOC$ is greater than 0, $$f(\Delta SOC) = k*((1+\Delta SOC)^n - 1) \text{ or}$$

in a case that $\Delta SOC$ is less than 0, $$f(\Delta SOC) = -k*((1+\Delta SOC)^n - 1)$$

wherein $\Delta SOC$ is the SOC difference between the first battery cluster corresponding to the first conversion unit and the X second battery clusters, I is an average cluster current of the X second battery clusters, k is a linear coefficient, and n is a power exponent.

16. An energy storage system control apparatus, wherein the apparatus comprises a processor and a memory, the memory is configured to store a computer program, and the processor is configured to call the computer program and cause the apparatus to implement the method according to claim 15.

* * * * *